United States Patent
Lall et al.

(10) Patent No.: US 7,466,190 B2
(45) Date of Patent: Dec. 16, 2008

(54) CHARGE PUMP WITH FOUR-WELL TRANSISTORS

(75) Inventors: Ravindar M. Lall, Portland, OR (US); Moshe Agam, Portland, OR (US); Kazi Habib, Portland, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 42 days.

(21) Appl. No.: 11/492,687

(22) Filed: Jul. 24, 2006

(65) Prior Publication Data
US 2008/0018379 A1    Jan. 24, 2008

(51) Int. Cl.
*G05F 1/10*     (2006.01)
*H01L 29/00*     (2006.01)

(52) U.S. Cl. .................. 327/537; 327/536; 257/499
(58) Field of Classification Search .......... 327/530, 327/534–537; 257/499, 355
See application file for complete search history.

(56) References Cited

U.S. PATENT DOCUMENTS

| | | | |
|---|---|---|---|
| 6,100,557 A * | 8/2000 | Hung et al. | 257/299 |
| 6,496,055 B2 * | 12/2002 | Li | 327/536 |
| 6,750,527 B1 * | 6/2004 | Momohara | 257/511 |
| 6,777,978 B2 * | 8/2004 | Hart et al. | 326/38 |
| 6,819,162 B2 | 11/2004 | Pelliconi | 327/536 |
| 7,009,857 B2 * | 3/2006 | Chen et al. | 363/60 |
| 7,089,527 B2 * | 8/2006 | Hart et al. | 716/17 |
| 2003/0214346 A1 | 11/2003 | Pelliconi | 327/536 |

OTHER PUBLICATIONS

"Power Efficient Charge Pump in Deep Submicron Standard CMOS Technology," by Roberto Pelliconi et al., Proceedings of the 27th European Solid-State Circuits Conference, Sep. 18-20, 2001, 4 pages.

* cited by examiner

*Primary Examiner*—Dinh T. Le
(74) *Attorney, Agent, or Firm*—Mendelsohn & Associates, PC; Steve Mendelsohn

(57) ABSTRACT

In one embodiment, a (negative-voltage) charge pump with one or more stages that receives a (high) input voltage and generates a higher-magnitude (negative) output voltage. Each stage has two capacitors for storing charges and two branches that alternate to transmit a higher-magnitude output voltage at every clock half cycle. Each branch has a PMOS transistor and a NMOS transistor. To reduce the effects of back body from the substrate, two transistors are constructed with three wells and two with four wells, where the number of wells per device is dependent upon the substrate type used.

2 Claims, 4 Drawing Sheets

CHARGE PUMP WITH FOUR-WELL TRANSISTORS

TECHNICAL FIELD

The present invention relates to integrated circuits and, more specifically, to charge pump circuits for high-voltage generation.

BACKGROUND

Integrated circuits are designed with ever-decreasing power supply ($V_{CC}$) voltage levels. Nevertheless, certain types of circuitry, such as flash memory cells, may require input voltage levels with relatively high magnitudes. Charge pump circuits may be used to provide such high voltage levels in integrated circuitry powered by relatively low power supply levels. For example, Pelliconi et al., "Power Efficient Charge Pump in Deep Submicron Standard CMOS Technology," Proceedings of the 27$^{th}$ European Solid-State Circuits Conference, 18-20 Sep. 2001, and U.S. Patent Publication No. 20030214346 (Pelliconi), the teachings of both of which are incorporated herein by reference, describe positive-voltage and negative-voltage charge pumps that can provide voltage levels having magnitudes greater than the available power supply levels. These charge pumps are implemented using triple-well devices. However, negative voltage charge pumps of this type suffer from back-body effects in which the transistors fail to conduct properly at certain power supply levels.

SUMMARY

In one embodiment, the present invention is an integrated circuit having a charge pump with one or more stages connected in series, each stage comprising first and second branches. The first branch has a first p-type transistor connected in series with a first n-type transistor at a first node and a first capacitor connected to the first node. The second branch has a second p-type transistor connected in series with a second n-type transistor at a second node and a second capacitor connected to the second node. The gates of the transistors in the first branch are connected to the second node, and the gates of the transistors in the second branch are connected to the first node. At least one of the transistors is a four-well device.

In another embodiment, the present invention is a method for operating such a charge pump. The method comprises applying (1) an input voltage to an input node of a first stage of the charge pump, (2) for each stage, a first clock signal to the side of the first capacitor not connected to the first node, and (3) for each stage, a second clock signal to the side of the second capacitor not connected to the second node, wherein the first clock signal is a phase-shifted version of the second clock signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
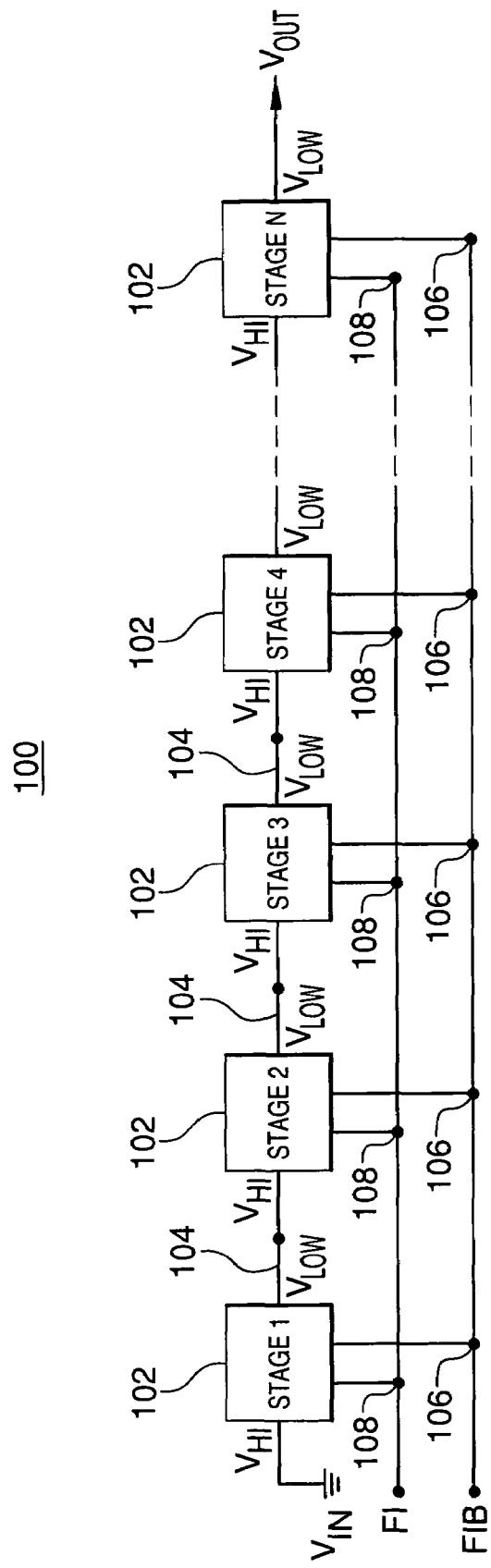
FIG. 1 shows a block diagram of a negative-voltage charge pump with multiple stages according to one embodiment of the present invention.

FIG. 1 shows a block diagram of a negative-voltage (NV) charge pump 100 with multiple stages 102 according to one embodiment of the present invention. NV charge pump 100 receives an input voltage $V_{IN}$, which, in this implementation, is grounded (i.e., $V_{IN} \approx 0V$). Input voltage $V_{IN}$ is sequentially and incrementally reduced via N stages 102, where the number of stages, N, is greater than or equal to one. These incremental voltage reductions are accumulated and output from NV charge pump 100 as a reduced output voltage (in this case, a negative voltage) $V_{OUT}$.

Each individual stage 102 receives a high-voltage input $V_{HI}$ and two clock signals FI and FIB, and outputs a reduced voltage $V_{LOW}$, where clock FIB is a 180-degree phase-shifted version of clock FI, such that FIB is high, when FI is low, and vice versa. Input voltage $V_{HI}$ of stage 1 is connected to the charge pump input voltage $V_{IN}$, and is thus equal to 0V. Furthermore, input voltage $V_{HI}$ of each subsequent stage 102 is connected to output voltage $V_{LOW}$ of the preceding stage 102 at nodes 104. This series connection of stages enables charge pump input voltage $V_{IN}$ built down, such that the final stage output $V_{LOW}$ is provided as the charge pump output voltage $V_{OUT}$. The magnitude of output voltage $V_{OUT}$ may be 1) increased by adding stages 102 or 2) reduced by removing stages 102.

Figure 2:
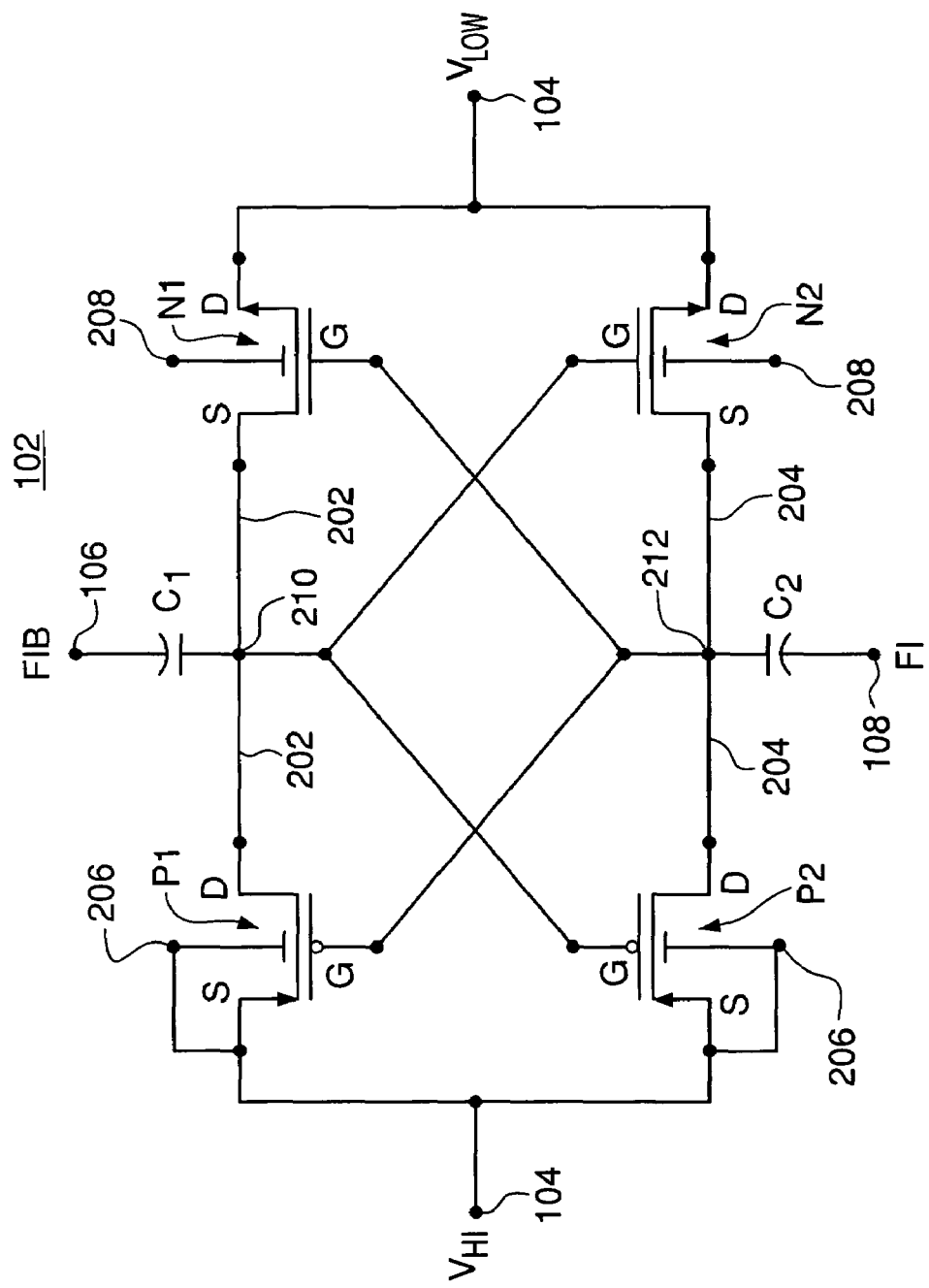
FIG. 2 shows a schematic diagram of each stage of the negative voltage charge pump of FIG. 1.

FIG. 2 shows a schematic diagram of each stage 102 of NV charge pump 100 of FIG. 1. Stage 102 is a voltage doubler circuit (i.e., stage 102 discharges reduced voltage twice for each clock cycle) with two charging capacitors $C_1$ and $C_2$. The first charging capacitor $C_1$ receives clock signal FIB via terminal 106, and the second charging capacitor $C_2$ receives clock signal FI via terminal 108. Clocks FI and FIB are generated by a conventional oscillator and have an amplitude of $V_{CC}$ (i.e., the power supply voltage level for the integrated circuit in which NV charge pump 100 is implemented). Additionally, the phase of FIB is shifted from the phase of FI, such that, when one signal is high, the other is low.

In addition to capacitors $C_1$ and $C_2$, stage 102 has an upper branch 202 and a lower branch 204, which alternate to produce $V_{LOW}$ every clock half cycle. Upper branch 202 has one PMOS (p-type metal-oxide semiconductor) transistor P1 and one NMOS (n-type metal-oxide semiconductor) transistor N1. Similarly, lower branch 204 has one PMOS transistor P2 and one NMOS transistor N2. As indicated in FIG. 2 and as described further below in reference to FIGS. 3 and 4, the low-voltage n-well of each PMOS transistor (i.e., well 308 of FIG. 3) is tied to its source region S at node 206, while the high-voltage p-well of each NMOS transistor (i.e., well 406 of FIG. 4) is floated (i.e., node 208 is not tied to anything).

During pumping operations, after the initial transient, a stationary situation is reached. In particular, when clock FI is low (e.g., 0V) and clock FIB is high (e.g., $V_{CC}$), transistors P1 and N2 are on, and transistors P2 and N1 are off. With P1 on and N1 off, node 210 is driven to voltage $V_{HI}$ through P1 and, with FIB high, capacitor $C_1$ charges to $V_{HI}+V_{CC}$. When clock FI goes high and clock FIB goes low, transistors P1 and N2 are turned off, transistors P2 and N1 are turned on, and the voltage at node 210 is driven from $V_{HI}$ to $V_{HI}-V_{CC}$ due to the charge stored in capacitor $C_1$. With N1 on, output node 104 is driven to voltage $V_{HI}-V_{CC}$ through N1.

At the same time (i.e., FI high and FIB is low), with P2 on and N2 off, node 212 is driven to voltage $V_{HI}$ through P2, and, with FI high, capacitor $C_2$ charges to $V_{HI}+V_{CC}$. When clock FIB goes high and clock FI goes low, transistors P1 and N2 are turned on, transistors P2 and N1 are turned off, and the voltage at node 212 is driven from $V_{HI}$ to $V_{HI}-V_{CC}$ due to the charge stored in capacitor $C_2$. With N2 on, output node 104 is driven to voltage $V_{HI}-V_{CC}$ through N2.

As shown in FIG. 2, the voltage at the source of each of transistors P1 and P2 is $V_{HI}$. As described above, the voltages at nodes 210 and 212 (and therefore the voltages at the gates of transistors P1 and P2 and the sources and gates of transistors N1 and N2) cycle variously between $V_{HI}$ and $V_{HI}-V_{CC}$. As such, the magnitude of the gate-to-source voltage for all four transistors never exceeds $V_{CC}$, for every stage in NV charge pump 100.

However, with every successive stage, as the magnitude of $V_{HI}$ gets larger, the magnitude of the maximum voltage difference between the source and the grounded substrate of each transistor also gets larger. If the NMOS and PMOS transistors of NV charge pump 100 were implemented as conventional one-well and two-well devices, respectively, these large source-to-bulk voltage differentials would cause back-body effects in which the transistors would fail to conduct properly.

Figure 4:
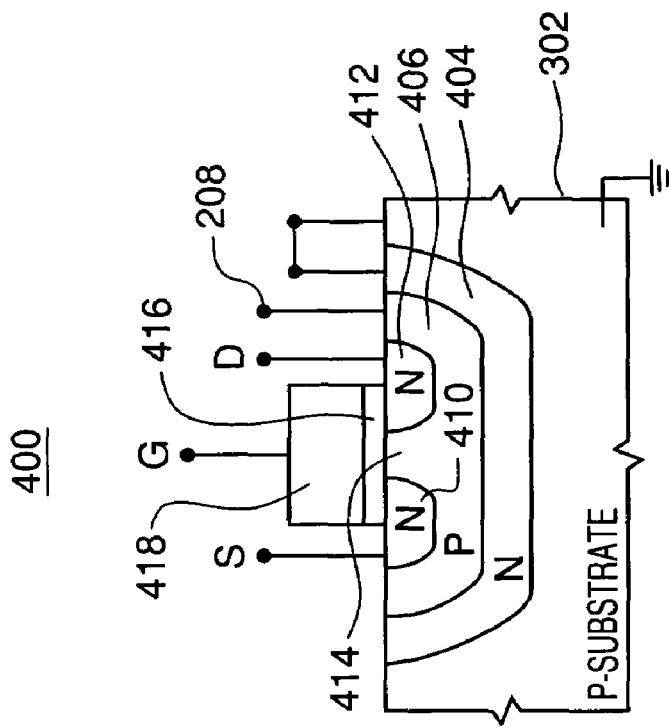
FIG. 4 shows a cross-sectional view of the device structure of a three-well NMOS transistor used in the stage of FIG. 2.
Figure 3:
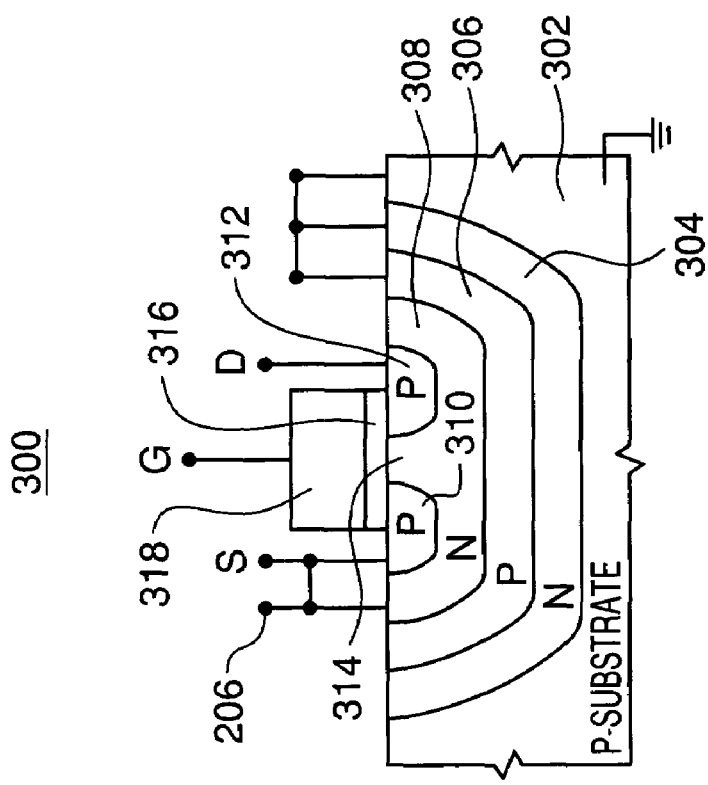
FIG. 3 shows a cross-sectional view of the device structure of a four-well PMOS transistor used in the stage of FIG. 2.

FIGS. 3 and 4 show cross-sectional views of the device structure of a four-well PMOS transistor 300 and a three-well NMOS transistor 400, respectively. Although not represented in FIGS. 3 and 4, transistors 300 and 400 are preferably implemented using shallow trench isolation (STI) techniques, wherein different active regions on the surface of the transistors are separated by STI structures. According to one embodiment of the present invention, four-well PMOS transistor 300 is used for each of transistors P1 and P2 in stage 102 of FIG. 2, and three-well NMOS transistor 400 is used for each of transistors N1 and N2, where all four devices are constructed on a p-type substrate 302. In an alternative embodiment, each stage could be constructed on an n-type substrate, in which case, each PMOS transistor would have three wells, and each NMOS transistor would have four wells.

PMOS transistor 300 of FIG. 3 is fabricated with a deep n-type well 304 in p-type (Epi) substrate 302 (herein considered a well), and a high-voltage (HV) p-type well 306 in deep n-well 304. Within HV p-well 306, a low-voltage (LV) n-type well 308 is implanted, followed by p-type regions 310 and 312 for the source and drain, respectively, within LV n-well 308. Between source region 310 and drain region 312 lies channel 314, through which current flows when PMOS 300 is turned on. Above channel 314, gate oxide 316 is formed, followed by the formation of gate 318. As represented in FIG. 3, deep n-well 304 and HV p-well 306 are connected to p-substrate 302, which is typically grounded. As previously represented in FIG. 2, source region S is connected to LV n-well 308 at node 206.

PMOS transistor 300 may be fabricated using the following embedded flash process sequence:
(1) STI formation (isolation between transistors)
(2) Deep n-well implant: P+ 2e13 2 Mev (before oxidations steps) at about 2-micron depth
(3) HV p-well implant: B+ 2e13 200 kev-400 kev (before oxidation steps) at about 1-micron depth
(4) Thermal drive (due to embedded flash process)
(5) LV n-well implant: P+ 2e13 360 kev (after oxidation steps) at about 0.6-micron depth
(6) Threshold adjust implant
(7) Gate oxide formation
(8) Poly gate formation
(9) Extension and pocket implant (LDD)
(10) Spacer formation
(11) Source/drain implant
(12) Co—Si salicide formation NMOS transistor 400 of FIG. 4 is fabricated beginning with the implant of deep n-well 404. Within deep n-well 404, an HV p-well 406 is implanted, followed by n-type regions 410 and 412 for the source and drain, respectively. Deep n-well 404 and HV p-well 406 may be fabricated similar to deep n-well 304 and HV p-well 306, respectively, of FIG. 3. Between source 410 and drain 412 lies channel 414. Above channel 414, gate oxide 416 is formed, followed by gate 418. As represented in FIG. 4, deep n-well 404 is connected to grounded p-substrate 302. As previously represented in FIG. 2, HV p-well 208 is floated, and therefore node 208 has no connection.

The four-well and three-well transistors of FIGS. 3 and 4 are used in place of conventional two-well and one-well transistors, in order to avoid back-body effects. In particular, in four-well PMOS transistor 300 of FIG. 3, HV p-well 306 and deep n-well 304 act as insulating layers that separate LV n-well 308 (and thus channel 314) from p-substrate 302. Additionally, because LV n-well 308 is connected to source 310, a negative bias is maintained at the junction of LV n-well 308 and HV p-well 306. This negative bias counters the effects of negative charges on p-substrate 302.

Figure 5:
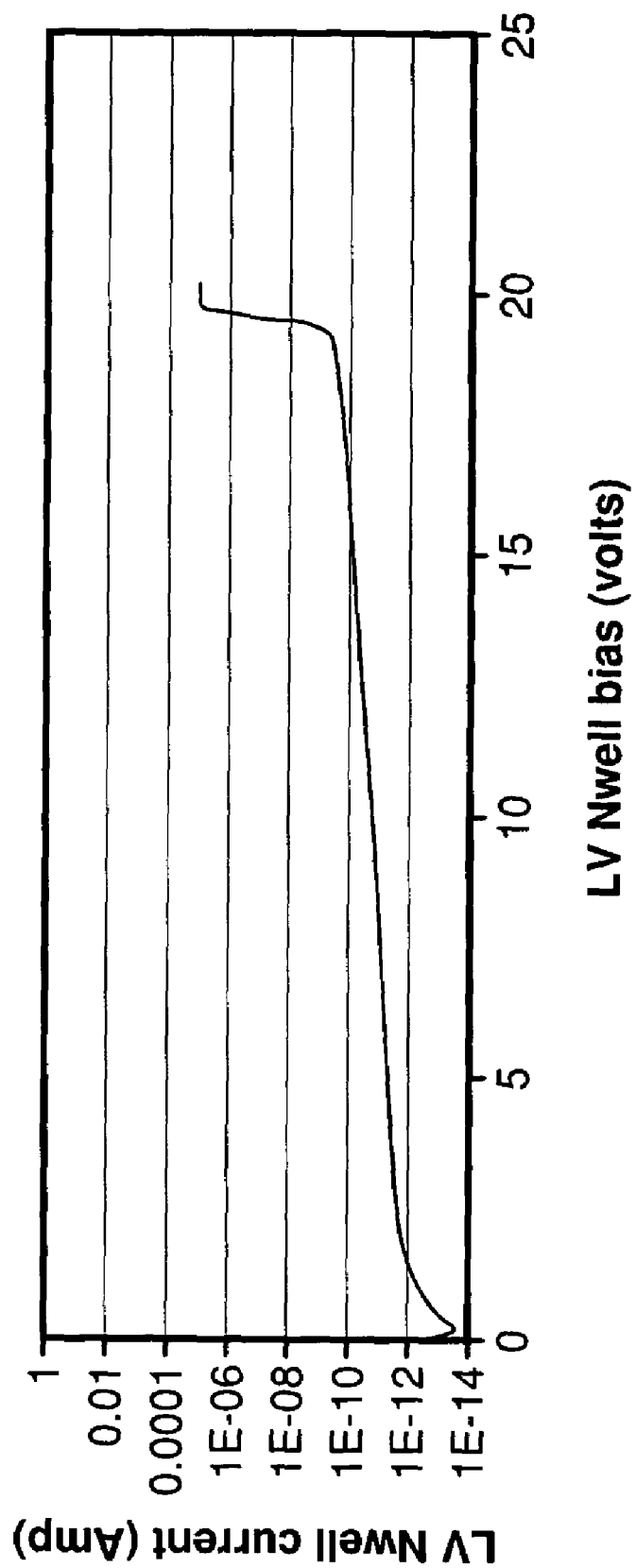
FIG. 5 shows a graphical representation of the characteristics of the LV n-well and HV p-well junction for the four-well PMOS transistor of FIG. 3.

FIG. 5 shows a graphical representation of the characteristics of LV n-well 308 and HV p-well 306 junction in four-well PMOS 300 of FIG. 3. For LV n-well 308 voltages less than about 19V, little current passes across the junction. At about 19V, however, the junction breaks down, and the current crossing this junction increases significantly. The combined benefits of the insulation layers and junction bias permit PMOS transistor 300 to be used for relatively high-voltage applications, such as those that occur in the latter stages 102 of NV charge pump 100 of FIG. 1.

Similarly, in NMOS transistor 400 of FIG. 4, deep n-well 404 provides an insulating layer between p-substrate 302 and HV p-well 406. In particular, deep n-well 404 prevents back-body effects resulting from charges on p-substrate 302.

Certain embodiments of the present invention may provide charge pumps with one or more of the following features:
  Circuit operation with substantially no threshold drop, such as diode-related threshold drops;
  Circuit operation with substantially no back-body effects;
  Substantially full $V_{cc}$ gain at every stage; and
  Circuit operation at relatively low $V_{CC}$ levels (e.g., 1.2V core voltage).

Although the present invention has been described in the context of negative-voltage charge pumps, the invention can be implemented in positive-voltage charge pumps as well.

Although the present invention has been described as being implemented using MOS transistor technology, the present invention can also be implemented using other transistor technologies, such as bipolar.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims. For example, the dimensions of PMOS and NMOS transistors of FIGS. 3 and 4 may be selected to obtain desired switching properties. These dimensions include, but are not limited to, thicknesses of gates 318 and 418, thicknesses of gate oxide 316 and 416, widths and lengths of channels 314 and 414, and implementation of a threshold voltage implant.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. An integrated circuit having a charge pump with one or more stages connected in series, the charge pump having an input node for receiving a charge pump input signal and an output node for presenting a charge pump output signal, at least one stage comprising:
    a first branch having a first p-type transistor connected in series with a first n-type transistor at a first node and a first capacitor connected to the first node; and
    a second branch having a second p-type transistor connected in series with a second n-type transistor at a second node and a second capacitor connected to the second node, wherein:
        the gates of the transistors in the first branch are connected to the second node;
        the gates of the transistors in the second branch are connected to the first node;
        at least one of the transistors is a four-well device;
        the first and second p-type transistors are four-well devices;
        the first and second n-type transistors are three-well devices;
        each four-well p-type transistor comprises:
            an n-type first well formed in a p-type substrate;
            a p-type second well formed in the n-type first well;
            an n-type third well formed in the p-type second well; and
            p-type source and drain regions formed in the n-type third well, wherein:
                the n-type third well is tied to the p-type source region; and
                the n-type first well and the p-type second well are tied to the p-type substrate;
        each three-well n-type transistor comprises:
            an n-type first well formed in the p-type substrate;
            a p-type second well formed in the n-type first well; and
            n-type source and drain regions formed in the p-type second well, wherein:
                the p-type second well is floated; and
                the n-type first well is tied to the p-type substrate.

2. A method for operating a charge pump with one or more stages connected in series, at least one stage having:
    a first branch having a first p-type transistor connected in series with a first n-type transistor at a first node and a first capacitor connected to the first node; and
    a second branch having a second p-type transistor connected in series with a second n-type transistor at a second node and a second capacitor connected to the second node, wherein:
        the gates of the transistors in the first branch are connected to the second node;
        the gates of the transistors in the second branch are connected to the first node; and
        at least one of the transistors is a four-well device, the method comprising:
    applying an input voltage to an input node of a first stage of the charge pump;
    applying, for each stage, a first clock signal to the side of the first capacitor not connected to the first node; and
    applying, for each stage, a second clock signal to the side of the second capacitor not connected to the second node, wherein:
        the first clock signal is a phase-shifted version of the second clock signal;
        the first and second p-type transistors are four-well devices;
        the first and second n-type transistors are three-well devices;
        each four-well p-type transistor comprises;
            an n-type first well formed in a p-type substrate;
            a p-type second well formed in the n-type first well;
            an n-type third well formed in the p-type second well; and
            p-type source and drain regions formed in the n-type third well, wherein:
                the n-type third well is tied to the p-type source region; and
                the n-type first well and the p-type second well are tied to the p-type substrate;
        each three-well n-type transistor comprises:
            an n-type first well formed in the p-type substrate;
            a p-type second well formed in the n-type first well; and
            n-type source and drain regions formed in the p-type second well, wherein:
                the p-type second well is floated; and
                the n-type first well is tied to the p-type substrate.

* * * * *